UNITED STATES PATENT OFFICE.

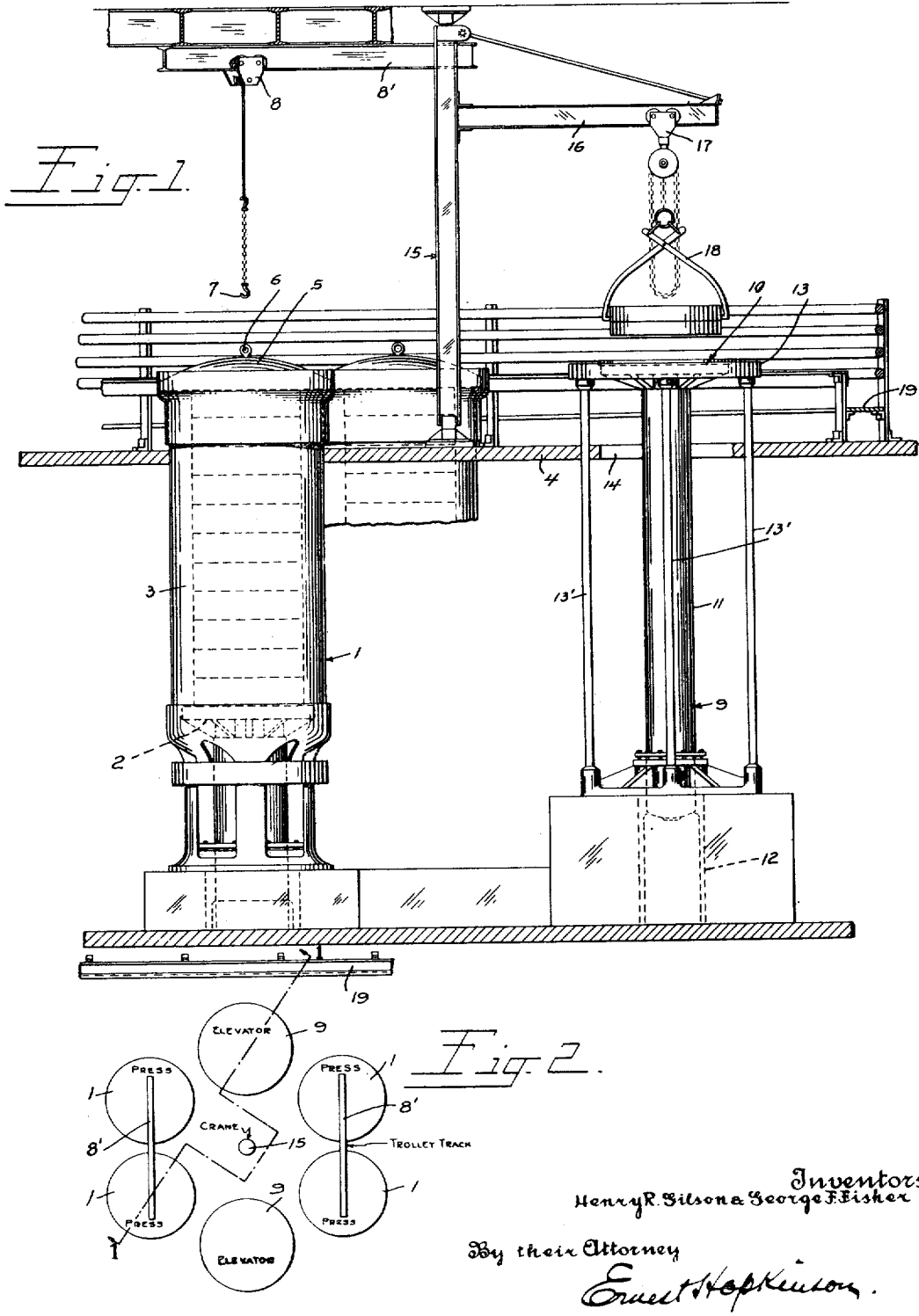

HENRY R. GILSON, OF NEW ROCHELLE, NEW YORK, AND GEORGE F. FISHER, OF PROVIDENCE, RHODE ISLAND, ASSIGNORS TO REVERE RUBBER COMPANY, A CORPORATION OF RHODE ISLAND.

METHOD AND APPARATUS FOR MANIPULATING VULCANIZING DEVICES.

1,424,470.  Specification of Letters Patent.  Patented Aug. 1, 1922.

Application filed June 24, 1920. Serial No. 391,154.

*To all whom it may concern:*

Be it known that we, HENRY R. GILSON and GEORGE F. FISHER, both citizens of the United States, residing at New Rochelle, county of Westchester, and State of New York, and Providence, county of Providence, and State of Rhode Island, respectively, have invented certain new and useful Improvements in Methods and Apparatus for Manipulating Vulcanizing Devices, of which the following is a full, clear, and exact description.

This invention relates to the manufacture of rubber articles such as tires, and particularly to a method and apparatus for manipulating or shifting molds in connection with vulcanizing operations.

In the vulcanization of tires, as an example, the molds in which they are cured are removed from the heaters or vulcanizers, transferred to stations or other convenient places for substituting an uncured tire in place of the cured tire, and subsequently returned to the heaters. In performing these operations it is usual to employ such labor saving devices as trucks or conveyors. Heretofore this transport or movement of the molds has been performed on the floor of a large room and, to distinguish or differentiate from the present invention, these operations may be said to have occurred in a horizontal plane. Without going into detail as to the apparatus used in the past, the prior practices in this part of tire manufacture are either objectionable or undesirable, for the reason that horizontal shift or transport of the molds in serving the heaters as well as in recharging the individual molds requires a great deal of floor space. With trucks or other labor saving lifting devices, interference of the operators thereof is not infrequent. With horizontal conveyor systems in which a large number of vulcanizers are served by a single conveyor unit, a mishap to any part of the latter is liable to hold up working the heaters to their maximum capacity and consequently is a constant source of anxiety.

The present invention relates to a method and apparatus for manipulating molds with a minimum of floor space. It further aims to group vulcanizing apparatus in a series of independent units so that mishap or accident to any one unit will not affect the others and will not render the whole force of operatives idle during the time lost in remedying the defect. It aims to devise a method and arrangement in which interference of the movements of the operatives will be avoided. And finally it endeavors to attain these several ends without loss of time in the interval between cures when the heaters are unloaded and reloaded.

With the illustrated embodiment of the invention in mind and in order to give a general idea of the invention but without intention to limit or restrict the scope thereof, the apparatus may be described briefly as comprising a series of upright French presses and open-topped rams or elevators grouped compactly for service with a crane that may be swung from one to another in transferring molds in whole or in sections.

These are the objects of our invention, and other objects thereof will appear in the following detailed description of the accompanying drawings, in which Fig. 1 is a section of the apparatus on the line 1—1 of Fig. 2 in which latter the relative arrangement of the parts or components is illustrated diagrammatically.

In the embodiment of the invention illustrated in the drawings, four presses or vulcanizers are indicated by the numeral 1. These are of the French type having a lower platen 2 operable hydraulically within an upright cylinder or casing 3 whose mouth, which is above the floor 4, is closed by a cover 5 equipped with any suitable fastening devices for locking it in place. When unloaded and lifted, the cover may have its eye 6 engaged with a hook 7 on a trolley or carriage 8 shiftably supported by an I-beam 8' and it may be pushed to an unobstructing position at one side of the heater's mouth.

The elevators, indicated generally by the numeral 9, may be of any suitable construction but preferably as shown are of the open-topped ram type with a mold supporting platform 10 carried by a vertically arranged plunger 11 which is operable in a pressure cylinder 12, guard ring 13 stayed by rods 13' being provided if desired to reduce the liability of accidents and compelling the operators to stack the molds properly on the platforms of the elevators. The floor 4 is suitably apertured as indicated at 14 to pass the platforms.

As many presses or vulcanizers and elevators or rams may be used as desired. These may be disposed in any suitable geometrical formation, preferably, however, as shown in a hexagonal arrangement about a pivoted crane 15 whose lateral arm 16 is equipped with a trolley 17 and depending tackle and tongs 18, or other suitable implements, by which the heavy molds may be lifted without undue manual exertions by the operators. The crane may be swung by a handle manually, but power may be used if desired, to bring its lateral arm 16 above and in line with one of the presses or elevators for service in shifting molds about.

While the number of presses and elevators may be varied as desired, it is preferred to use two elevators, as shown, between pairs of presses, one elevator as a receiving station to care for the molds that have been through a heat, and the other elevator as a supply station from which the molds may be taken immediately a vulcanizer has been emptied. But while the number and arrangement of the presses and elevators may be varied as desired, the unit illustrated has been found satisfactory for keeping the minimum number of operatives busy throughout their shift.

Assuming that the heat on one of the presses has been run, the method of procedure with the apparatus is as follows:

The press is opened and its cover moved to an unobstructing position at one side with the aid of the hook 7 and trolley 8, but obviously other means may be used for this purpose. Then the molds with the cured tires inside are successively removed with the crane and its adjuncts to one of the elevators, the platen of the press and the platform of the elevator being moved up and down respectively at a slow rate, or intermittently, to allow the operative to shift the molds in the clear space intervening and at an elevation substantially the same in every case. When all of the cured tires in molds have been removed, a batch of molds previously charged with uncured tires and previously stacked on the second elevator are transferred to the press and stacked therein as before. In this latter operation the elevator and press platens are moved vertically in parallelism but in opposite directions to maintain the elevation of the uppermost folds the same, or approximately so, for facilitating the operator's handling of the molds. The press is then closed and the cure started.

With the four presses and two elevators arranged as illustrated, the duration of the cure is such that the crew on any one unit may in the time interval intervening before a second one of the presses completes its heat now spend their time in substituting an uncured tire for a cured tire in the several molds of those that have been stacked on one of the elevators. This recharging operation of the molds may be performed in any suitable manner. Advantageously with the apparatus shown it may be done by successively transferring the several sections of each of the molds from one elevator to the other. Supposing that the molds are of the usual two-piece construction with complementary opposed curves in their many faces, the top section is lifted up and transferred to the second elevator, now empty, on which it is placed upside down and filled with an uncured tire while a cured tire or article is being removed from the exposed lower half section of the mold and passed to a gravity run-way or conveyor 19, conveniently located to one side of a series of units. The uncured tires may be supplied in any suitable manner as by a conveyor or trucks to the supply station or second elevator. The bottom mold section, now empty, is then transferred to the second elevator, or supply station, and placed upside down on its mating half. Thus a hold is emptied and refilled and transferred from one station to the other. A second mold is similarly opened, emptied and refilled, the stack of molds on one elevator decreasing and on the other elevator increasing until they have all been transferred from one to the other and the elevation of the uppermost mold of a stack being kept constant, or nearly so, by suitably controlling the admission of fluid to the rams or elevators. By this time the heat on a second of the presses will have been run and the operators will proceed through another cycle of operations.

While the foregoing method is deemed the preferable way to utilize the apparatus, it is to be distinctly understood that the invention in the apparatus is not confined to such procedure. It may be desirable for some purposes to discharge the molds from a heater after the cure has been run onto one of the elevators. When a heater has been emptied in this manner, the upper section of the topmost mold may be transferred immediately back into the same heater, upside down, and filled with an uncured tire, the cured tire in the meantime being removed from the undisturbed lower section of the same mold. The lower section may then be shifted and inverted upon its mating half, resting on the platen of the press. By repeating these operations, the stack of cured molds may be unloaded and the heater reloaded with tires filling the molds.

From the above description, it will be seen that the apparatus comprises a compact grouping of presses and mold manipulating devices for manning by a few operatives, that the storage or accumulation of molds is effected vertically as distinguished from horizontally with an attendant saving of floor space, that the system permits of expanding the number of units to keep pace with expansion or increase of production, that competition between crews of several units may be induced to increase the daily output and reduce the cost of production, that the units are independent of one another and hence mishap or trouble with one is not accompanied by any undesirable idleness of all hands employed in the vulcanizing room, and finally that the several batches of molds are moved a minimum distance from the vulcanizers during the necessary manipulation thereof.

It is to be understood, however, that the invention is not limited in any way to the precise details of construction or the method of procedure shown and described, excepting as indicated by the accompanying claims, to which reference should be made for an understanding of its scope.

Having thus described our invention, what we claim and desire to protect by Letters Patent is:

1. A vulcanizing unit comprising a polygonal arrangement of presses and elevators having vertically movable platforms, and means for shifting the molds to and from the presses and elevators.

2. A vulcanizing unit comprising a polygonal arrangement of presses and elevators having vertically movable platforms, a floor near the mouths of said presses, and means for shifting the molds to and from the presses and elevators.

3. Apparatus of the class described including a press having its mouth adjacent a floor level, movable platforms for supporting molds, said press and platforms being arranged in triangular relation, a pivoted crane for serving the press and platforms, and means for moving the crane platforms and press relative to one another to maintain the uppermost of molds stacked on the platforms at substantially a constant elevation whereby manipulation of molds with the crane is facilitated.

4. Apparatus of the class described including upright presses and elevators disposed to form a geometrical figure, a floor, and means beneath the floor for operating the elevators whereby batches of molds in the vulcanizer may be accumulated vertically in stacks partially at least below the level of the floor.

5. Apparatus of the class described comprising upright vulcanizers and elevators in polygonal formation, the space above the mouths of the presses and above the platforms of the elevators being clear of obstructions to the transfer of the molds from one to the other.

6. A vulcanizing unit comprising a hexagonal arrangement of presses and elevators of which latter there are at least two, and a pivoted crane disposed centrally of and capable of serving each of said presses and elevators.

7. A vulcanizing unit comprising a plurality of upright presses and elevators the former of which exceed the latter in number, a floor adjacent the mouths of the presses, rams operable from beneath the floor for maintaining the uppermost of molds stacked in the presses and on the elevators at a convenient elevation, and a central pivoted member for facilitating shifting the molds to and from the presses and elevators and between the elevators.

8. A method of manipulating molds which includes moving the molds of a batch thereof containing cured and uncured articles in substantially horizontal and vertical paths to empty and load vulcanizers, and similarly moving the sections of the mold piece by piece while emptying and recharging the several molds.

9. A method of manipulating sectional molds in vulcanizing articles which includes moving molds from a vulcanizer after curing the articles therein and stacking them at a station, loading the emptied vulcanizer with previously filled molds, substituting uncured for the cured articles in the stacked molds while shifting and restacking the mold sections at a second station, the uppermost molds of the stacks being maintained at a substantially constant elevation during the shifting thereof.

Signed at Providence, Rhode Island, this 17th day of June, 1920.

HENRY R. GILSON.
GEORGE F. FISHER.